（12) United States Patent
Abedini et al.

(10) Patent No.: US 10,999,871 B2
(45) Date of Patent: May 4, 2021

(54) RANDOM ACCESS PROCEDURE FOR CV2X

(71) Applicant: QUALCOMM Incorporated, San Diego, CA (US)

(72) Inventors: Navid Abedini, Somerset, NJ (US); Zhibin Wu, Sunnyvale, CA (US); Kapil Gulati, Hillsborough, NJ (US); Sudhir Kumar Baghel, Hillsborough, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/426,813

(22) Filed: May 30, 2019

(65) Prior Publication Data

US 2019/0380152 A1 Dec. 12, 2019

Related U.S. Application Data

(60) Provisional application No. 62/682,601, filed on Jun. 8, 2018.

(51) Int. Cl.
*H04W 74/08* (2009.01)
*H04W 4/40* (2018.01)
(Continued)

(52) U.S. Cl.
CPC ......... *H04W 74/0833* (2013.01); *H04W 4/40* (2018.02); *H04W 48/16* (2013.01); *H04W 56/0045* (2013.01); *H04W 72/0446* (2013.01)

(58) Field of Classification Search
None
See application file for complete search history.

(56) References Cited

U.S. PATENT DOCUMENTS

2011/0299415 A1* 12/2011 He .................... H04W 74/0833
370/252
2013/0003682 A1* 1/2013 Jiang ................. H04W 56/0045
370/329
(Continued)

FOREIGN PATENT DOCUMENTS

WO 2017220247 A1 12/2017

OTHER PUBLICATIONS

International Search Report and Written Opinion—PCT/US2019/035017—ISA/EPO—dated Aug. 8, 2019.
(Continued)

*Primary Examiner* — Anh Vu H Ly
(74) *Attorney, Agent, or Firm* — Arent Fox LLP

(57) ABSTRACT

Methods, apparatuses, and computer-readable mediums for wireless communication are disclosed by the present disclosure. In an example, a client wireless device may transmit a random access channel (RACH) preamble on a first time domain resource to a recipient such as a host wireless device. The client wireless device may later transmit a second RACH message to the recipient on a second time domain resource after the first time domain resource. The second time domain resource may be defined by a mapping from the first time domain resource. The recipient may transmit a third RACH message establishing a communication session between the host wireless device and the client wireless device. The second RACH message may include one or more of: an identifier of the wireless device; an identifier of the recipient of the second RACH message; a resource configuration for subsequent RACH messages; or timing information.

28 Claims, 9 Drawing Sheets

(51) Int. Cl.
  *H04W 56/00* (2009.01)
  *H04W 48/16* (2009.01)
  *H04W 72/04* (2009.01)

(56) References Cited

U.S. PATENT DOCUMENTS

| | | | |
|---|---|---|---|
| 2017/0215119 A1* | 7/2017 | Hong | H04W 56/001 |
| 2017/0289733 A1* | 10/2017 | Rajagopal | H04W 4/70 |
| 2018/0109976 A1 | 4/2018 | Ly et al. | |
| 2018/0124771 A1* | 5/2018 | Mok | H04W 72/048 |
| 2018/0242367 A1* | 8/2018 | Kim | H04L 5/001 |
| 2018/0279259 A1* | 9/2018 | Gulati | H04W 72/10 |
| 2019/0124491 A1* | 4/2019 | Lim | H04W 52/281 |
| 2019/0124698 A1* | 4/2019 | Wu | H04W 4/40 |
| 2019/0124715 A1* | 4/2019 | Chen | H04W 76/27 |
| 2019/0223255 A1* | 7/2019 | Jeon | H04L 5/0048 |
| 2019/0253866 A1* | 8/2019 | Abedini | H04L 5/0094 |
| 2019/0253955 A1* | 8/2019 | Abedini | H04L 27/2692 |
| 2019/0268748 A1* | 8/2019 | Abedini | H04L 67/16 |
| 2019/0268829 A1* | 8/2019 | Abedini | H04W 48/14 |
| 2019/0268868 A1* | 8/2019 | Abedini | H04W 74/0833 |
| 2019/0268944 A1* | 8/2019 | Abedini | H04W 8/005 |
| 2019/0268945 A1* | 8/2019 | Abedini | H04W 8/005 |
| 2019/0306817 A1* | 10/2019 | Abedini | H04W 56/005 |
| 2019/0357092 A1* | 11/2019 | Jung | H04W 74/0833 |
| 2019/0380121 A1* | 12/2019 | Wu | H04W 40/22 |
| 2019/0380152 A1* | 12/2019 | Abedini | H04W 48/16 |
| 2019/0387548 A1* | 12/2019 | Kim | H04W 72/0406 |
| 2020/0029259 A1* | 1/2020 | Yiu | H04W 74/008 |
| 2020/0107247 A1* | 4/2020 | Ioffe | H04W 76/10 |
| 2020/0107275 A1* | 4/2020 | Cho | H04W 52/325 |
| 2020/0120458 A1* | 4/2020 | Aldana | H04W 28/22 |
| 2020/0245119 A1* | 7/2020 | Tabet | H04L 67/12 |
| 2020/0267803 A1* | 8/2020 | Kwak | H04W 74/0833 |

OTHER PUBLICATIONS

ITL: "Remaining details on RACH timing for NR", 3GPP Draft; R1-1804590_Remaining_RACH Timing, 3rd Generation Partnership Project (3GPP), Mobile Competence Centre ; 650, Route Des Lucioles ; F-06921 Sophia-Antipolis Cedex; France, vol. RAN WG1, No. Sanya, China; Apr. 16, 2018-Apr. 20, 2018, Apr. 15, 2018 (Apr. 15, 2018), XP051426859, 7 Pages, Retrieved from the Internet: URL:http://www.3gpp.org/ftp/Meetings%5F3GPP%5FSYNC/RAN1/Docs/ [retrieved on Apr. 15, 2018].

* cited by examiner

RANDOM ACCESS PROCEDURE FOR CV2X

CLAIM OF PRIORITY UNDER 35 U.S.C. § 119

This application claims priority to U.S. Provisional Application No. 62/682,601 titled "RANDOM ACCESS PROCEDURE FOR CV2X," filed Jun. 8, 2018, which is assigned to the assignee hereof, and incorporated herein by reference in its entirety.

BACKGROUND

Technical Field

The present disclosure relates generally to communication systems, and more particularly, techniques for cellular vehicle-to-everything (CV2X) in 5G New Radio (NR).

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

For example, CV2X communications may include devices discovering and communicating with other nearby devices. Beamforming techniques used with various frequency bands in NR may complicate existing discovery and random access techniques. Thus, improvements in wireless communication operations may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Methods, apparatuses, and computer-readable mediums for wireless communication are disclosed by the present disclosure. In an aspect, the present disclosure includes a method of wireless communications. The method may include transmitting, from a wireless device such as a user equipment (UE), base station, or relay node, a random access channel (RACH) preamble on a first time domain resource to a recipient. The method may include transmitting, from the wireless device, a second RACH message to the recipient on a second time domain resource after the first time domain resource, the second time domain resource being defined by a mapping from the first time domain resource.

In another aspect, the disclosure provides a method of wireless communication. The method may include receiving, at a host wireless device such as a user equipment (UE), base station, or relay node, a random access channel (RACH) preamble on a first time domain resource from a client UE. The method may include receiving, at the host wireless device, a second RACH message from the client wireless device on a second time domain resource after the first time domain resource, the second time domain resource being defined by a mapping from the first time domain resource.

In another aspect, the disclosure provides a client wireless device for wireless communication. The client wireless device may include a memory and a processor in communication with the memory. The processor may be configured to transmit, from a wireless device, a random access channel (RACH) preamble on a first time domain resource to a recipient. The processor may be configured to transmit, from the wireless device, a second RACH message to the recipient on a second time domain resource after the first time domain resource, the second time domain resource being defined by a mapping from the first time domain resource.

In another aspect, the disclosure provides a host device for wireless communications. The host device may include a memory and a processor in communication with the memory. The processor may be configured to receive, at the host device, a random access channel (RACH) preamble on a first time domain resource from a client wireless device. The processor may be configured to receive, at the host device, a second RACH message from the client wireless device on a second time domain resource after the first time domain resource, the second time domain resource being defined by a mapping from the first time domain resource.

In another aspect, the disclosure provides a client wireless device for wireless communication. The client wireless device may include means for transmitting, from the client wireless device, a random access channel (RACH) preamble on a first time domain resource to a recipient. The client wireless device may include means for transmitting, from the client wireless device, a second RACH message to the recipient on a second time domain resource after the first time domain resource, the second time domain resource being defined by a mapping from the first time domain resource.

In another aspect, the disclosure provides a host device for wireless communications. The host device may include means for receiving, at the host device, a random access channel (RACH) preamble on a first time domain resource from a client wireless device. The host device may include means for receiving, at the host device, a second RACH message from the client wireless device on a second time domain resource after the first time domain resource, the second time domain resource being defined by a mapping from the first time domain resource.

In another aspect, the disclosure provides a non-transitory computer-readable medium storing computer code executable by a processor for wireless communications. The non-transitory computer-readable medium may include code to transmit, from a wireless device, a random access channel (RACH) preamble on a first time domain resource to a recipient. The non-transitory computer-readable medium may include code to transmit, from the wireless device, a second RACH message to the recipient on a second time domain resource after the first time domain resource, the second time domain resource being defined by a mapping from the first time domain resource.

In another aspect, the disclosure provides a non-transitory computer-readable medium storing computer code executable by a processor for wireless communications. The non-transitory computer-readable medium may include code to receive, at a host device, a random access channel (RACH) preamble on a first time domain resource from a client wireless device. The non-transitory computer-readable medium may include code to receive, at the host device, a second RACH message from the client wireless device on a second time domain resource after the first time domain resource, the second time domain resource being defined by a mapping from the first time domain resource.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION

Figure 1:
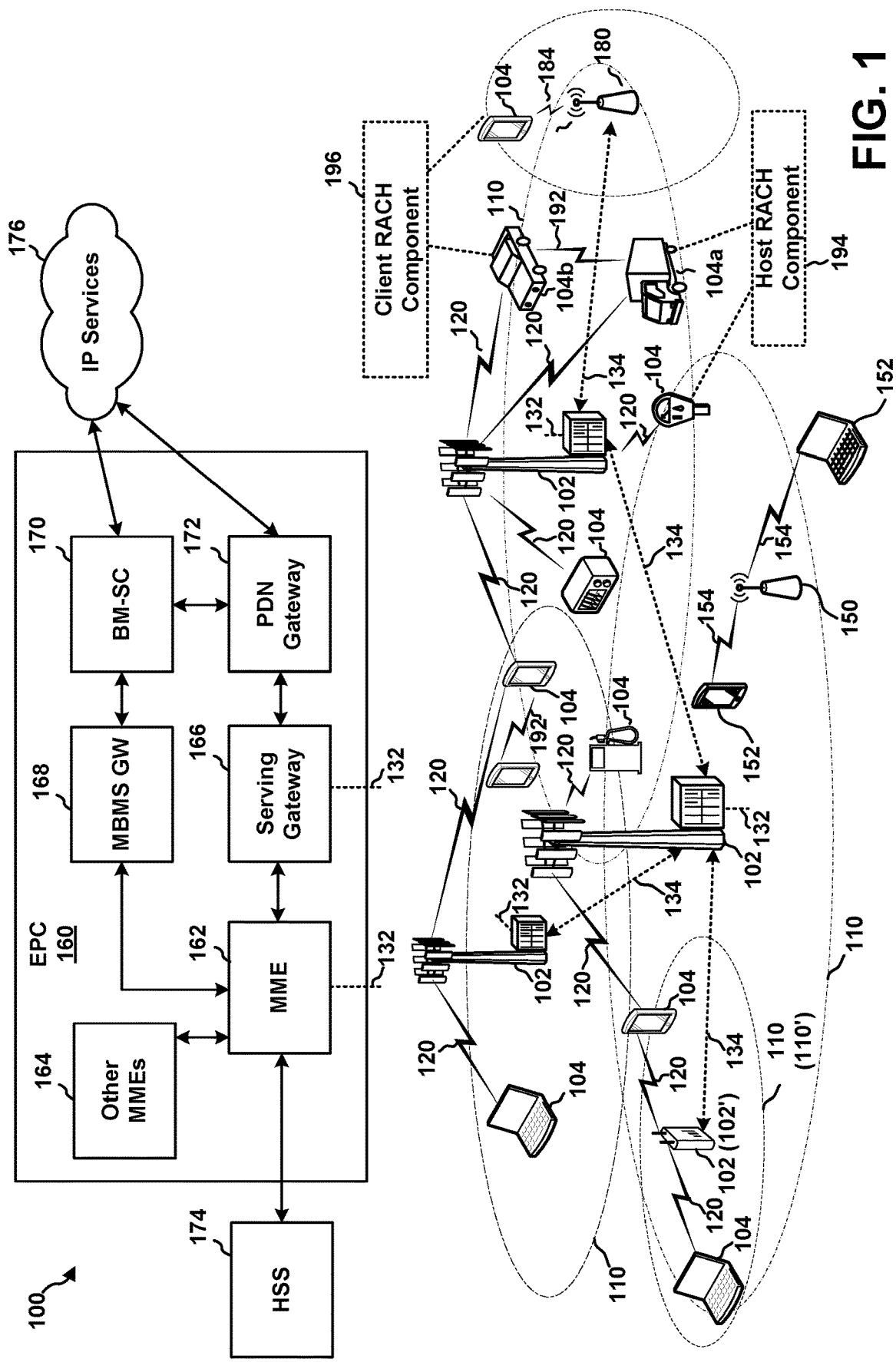
FIG. 1 is a block diagram illustrating an example of a wireless communications system and an access network.

Methods, apparatuses, and computer-readable mediums for wireless communication are disclosed by the present disclosure. In an example, a host device (e.g., a base station or user equipment) and a client device (e.g., a user equipment) may perform a discovery and random access procedure. Conventionally, a random access procedure for a cellular network involves a UE transmitting a random access channel (RACH) preamble, which is also referred to as a RACH message 1. As used herein, a random access procedure may refer to one or more wireless communications in which one or more communicating devices are not yet identified to each other and in which specific resources are not reserved for the communication between the devices. A random access procedure may establish a communication channel between the devices in which the devices are identified and resources are reserved. The base station then responds to the RACH message 1 with a RACH message 2 that includes timing information such as a timing advance that may be used to align timing of the UE with the base station. The UE and base station may then complete the RACH procedure by transmitting a RACH message 3 and RACH message 4 to resolve conflicts and exchange identifiers.

In a CV2X scenario, a client device (e.g., a UE) may discover a host device which may be another UE or a base station. In contrast to an access scenario where a UE connects to a base station that is expected to receive numerous connection requests, in a CV2X scenario a host device may not expect as many connection requests. As such, a rate of collisions may be lower. Additionally, in CV2X scenarios a UE may have an external timing reference, such as a global positioning system (GPS) or cellular network connection that may be used to adjust transmit and receive timing references. Accordingly, determining a timing advance during a RACH procedure may not be necessary. Therefore, the conventional utility of a RACH message 2 may be diminished in a CV2X scenario. Further, the client device may actually be busier than the host device. For example, the client device may have existing connections to other host devices, whereas the host device may be advertising a service to establish new connections. In such situations, the client device may be better situated to coordinate resources for establishing the connection because the client device may be aware of resources that are reserved for other communications.

The present disclosure provides an alternative RACH procedure in which a client device may transmit both a RACH preamble and a subsequent second RACH message. For example, the client device may transmit both the RACH preamble and a subsequent second RACH message without receiving a communication from the host device. The second RACH message may include any combination of an identifier of the client device, an identifier of the host device, a resource or configuration for subsequent RACH messages or later communications, and/or timing information such as a timing offset between the client device and the host device or a timing reference for a third RACH message.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media may comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. Although an EPC 160 is illustrated, the wireless communications system may include a different core network such as a 5G Core (5GC). References herein to the EPC 160 may also refer to a 5GC. The base stations 102 may include macro cells (high power cellular base station) and/or small cell base stations (low power cellular base station). The UEs 104 may include host UEs 104a that advertise services on the preconfigured discovery resources and client UE 104b that respond The base stations 102 (collectively referred to as Evolved Universal Mobile Telecommunications System (UMTS) Terrestrial Radio Access Network (E-UTRAN)) interface with the EPC 160 and/or 5GC through backhaul links 132 (e.g., S1 interface). The backhaul links 132 may be wired or wireless. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 and/or 5GC) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell base station 102' may have a coverage area 110' that overlaps the coverage area 110 of one or more macro cell base stations 102. A network that includes both small cell base stations and macro cell base stations may be known as a heterogeneous network. A heterogeneous network may also include Home Evolved Node Base Stations (eNBs) (HeNBs), which may provide service to a restricted group known as a closed subscriber group (CSG). The access network 100 may include relay nodes that forward transmissions between a base station 102 and a UE 104. The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. An antenna may include one or more antennas, antenna elements, and/or antenna arrays. Various antenna designs and corresponding transmission techniques for arrays of antennas and antenna elements are well known. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell base station 102' may operate in a licensed and/or an unlicensed frequency spectrum. When operating in an unlicensed frequency spectrum, the small cell base station 102' may employ NR and use the same 5 GHz unlicensed frequency spectrum as used by the Wi-Fi AP 150. The small cell base station 102', employing NR in an unlicensed frequency spectrum, may boost coverage to and/or increase capacity of the access network.

A gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. In an aspect, a gNB 180 operating using mmW may utilize beamforming 184 with the UE 104 to compensate for the extremely high path loss and short range. Additionally, UEs 104 performing D2D communications may operate using mmW and may also utilize beamforming 184.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 and/or 5GC for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, one or more UEs 104 may be configured for CV2X communications between UEs 104. The UEs 104 may include various devices related to vehicles and transportation. For example, the UEs 104 may include vehicles, devices within vehicles, and transportation infrastructure such as roadside devices, tolling stations, fuel supplies, or any other device that that may communicate with a vehicle. A UE 104 may act as either a host device or a client device for CV2X communication. A host UE 104a may include a host RACH component 194 for establishing communications with a client UE 104b for CV2X services supported by the host UE 104a. The client UE 104b may include a client RACH component 196 for establishing communications with the host UE 104a using an alternative RACH procedure. Moreover, a UE 104 may act as both a host and a client. For example, a vehicle may act as a host to provide speed and braking updates to surrounding vehicles and act as a client to communicate with a tolling station. Accordingly, a single UE 104 may include both a host RACH component 194 and a client RACH component 196. Further details of the host RACH component 194 and the client RACH component 196 are illustrated in FIG. 8.

Figure 8:
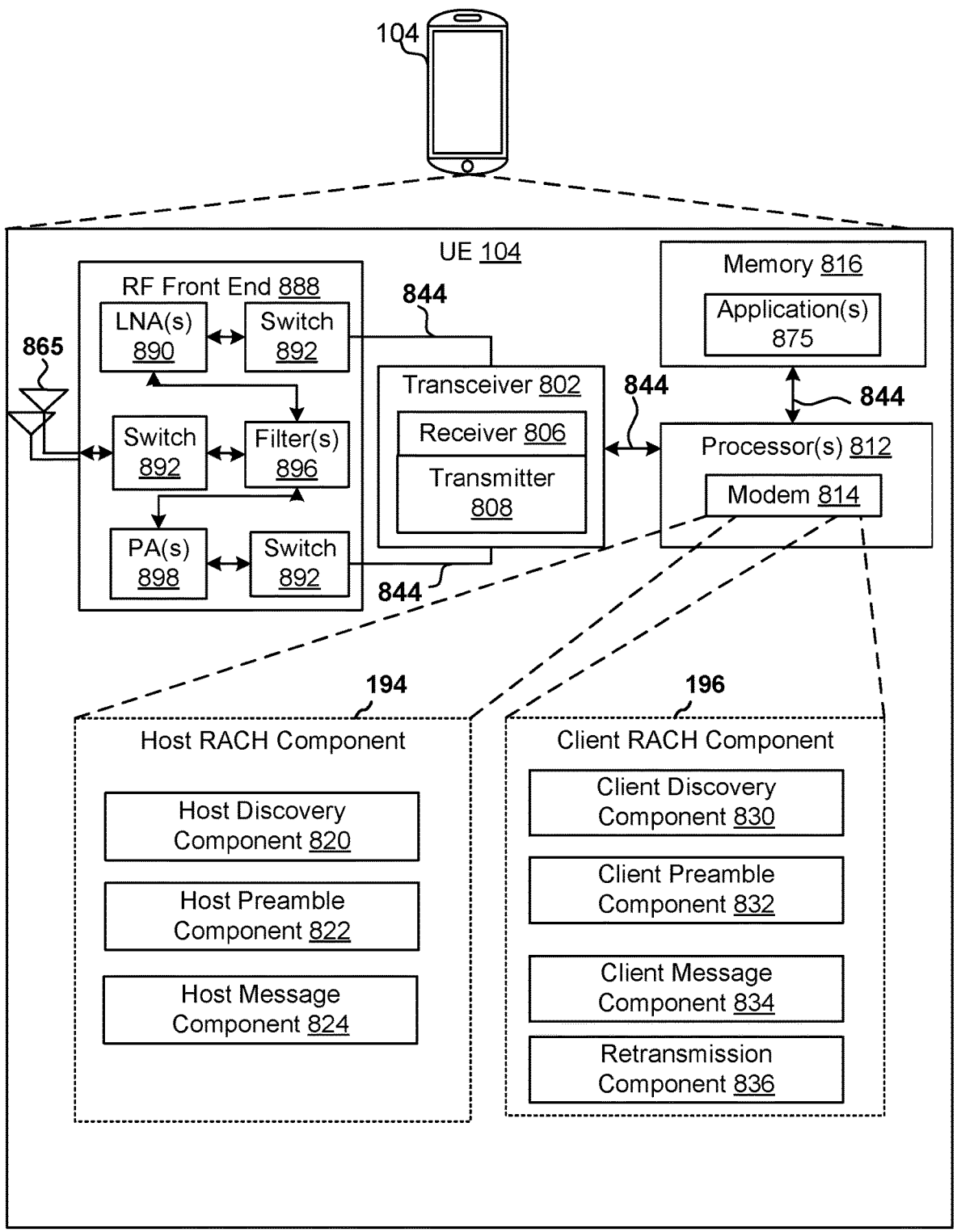
FIG. 8 is a schematic diagram of example components of the UE of FIG. 1.

Referring to FIG. 8, the host RACH component 194 may include a host discovery component 820 for advertising services and configurations during a discovery procedure, a host preamble component 822 for receiving a RACH preamble, and a host message component 824 for receiving a second RACH message and transmitting a third RACH message.

The client RACH component 196, shown in FIG. 8, may include a client discovery component 830 for receiving a discovery message from the host UE 104a during a discovery procedure, a client preamble component 832 for transmitting a RACH preamble, and a client message component 834 for transmitting a second RACH message. The client RACH component 196 may also include a retransmission component 836 for receiving a third RACH message from the host UE 104a and retransmitting the RACH preamble or second RACH message in response to determining that the third RACH message is not received.

In mmW communication systems (e.g., access network 100), a line of sight (LOS) may be needed between a transmitting device (e.g., base station 102) and a receiving device (e.g., UE 104), or between two UEs 104. Frequency is very high in mmW communication systems which means that beam widths are very small, as the beam widths are inversely proportional to the frequency of the waves or carriers transmitted by an antenna of the transmitting device. Beam widths used in mmW communications are often termed as "pencil beams." The small wavelengths may result in many objects or materials acting as obstacles including even oxygen molecules. Therefore, LOS between the transmitter and receiver may be required unless a reflected path is strong enough to transmit data. Further, in some examples, base stations may track UEs 104 to focus beams for communication.

Figure 2:
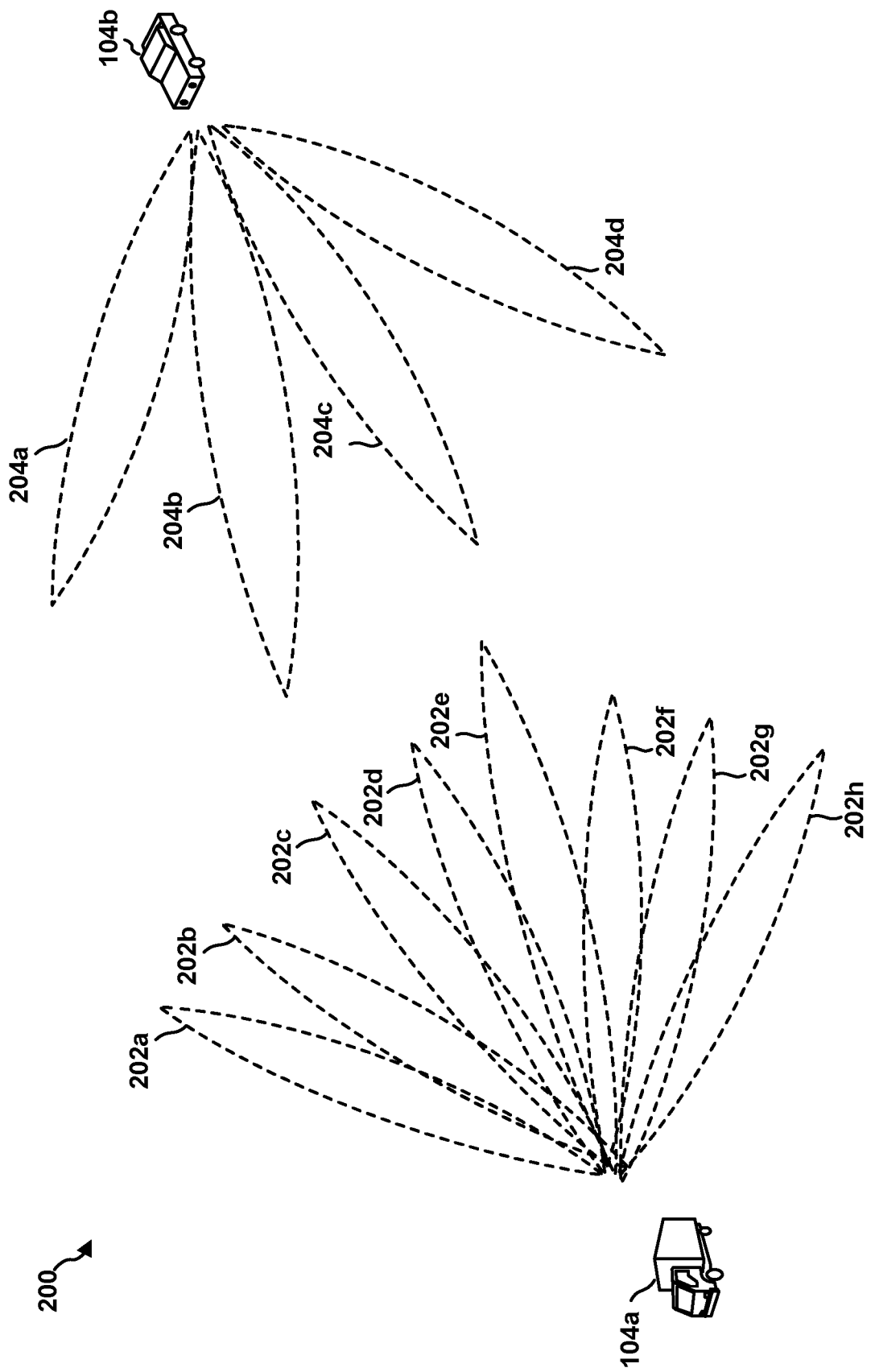
FIG. 2 is a block diagram of example UEs communicating using beamforming.

FIG. 2 is a diagram 200 illustrating a host UE 104a in communication with a client UE 104b. Referring to FIG. 2, the host UE 104a may transmit one or more beams 202a, 202b, 202c, 202d, 202e, 202f, 202g, or 202h to the client UE 104b, where the beams may be in one or more directions. The client UE 104b may receive the one or more beams 202a-202h in the same direction as transmitted by the Host UE 104a or in another direction due to reflection. The client UE 104b may also transmit one or more beams 204a, 204b, 204c, and 204d to the Host UE 104a, where the beams may be in one or more directions. The host UE 104a may receive the one or more beams 204a-204d in the same direction as transmitted by the client UE 104b or in another direction due to reflection. The host UE 104a and/or the client UE 104b may perform beam training to determine the best beams for each of the host UE 104a/the client UE 104b to transmit/receive.

The use of beamforming may impact discovery signals for CV2X communication. In some conventional D2D systems, discovery signals are broadcast by a host device to allow other devices to discover services offered by the host device. When beamforming is used to transmit a discovery signal, devices that are not positioned directly within the beam may not receive the signal. In an aspect, multiple transmissions of a discovery signal may be used to perform beam sweeping by transmitting the discovery signal in different directions. The multiple transmissions, however, may increase resource usage for the discovery signal.

Figure 3:
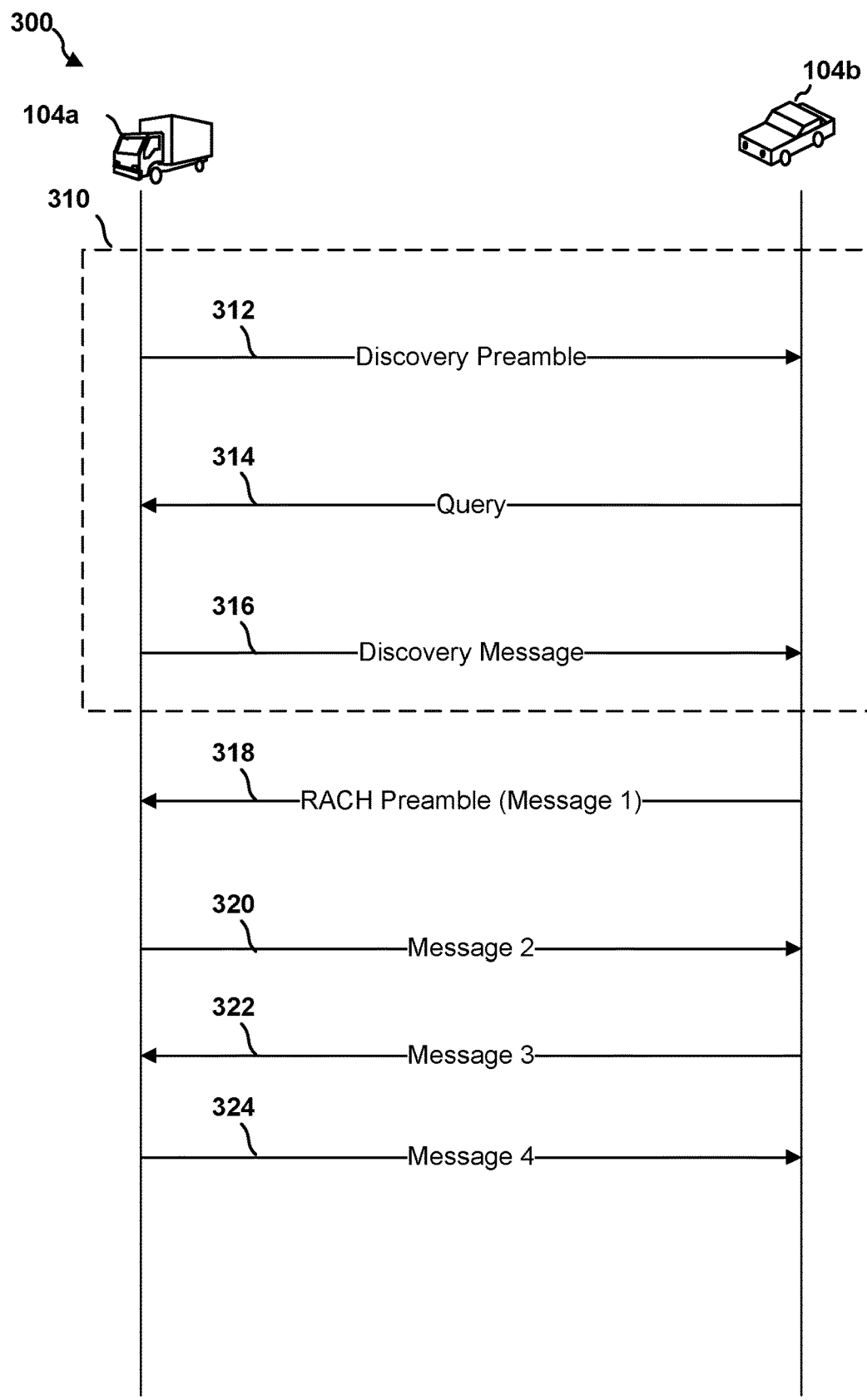
FIG. 3 is a message diagram showing an example of discovery and connection setup between UEs.

FIG. 3 is a message diagram 300 illustrating example signals that may be used for discovery and connection establishment between the host UE 104a and the client UE 104b. In an aspect, one or more discovery signals may utilize preconfigured discovery resources for a discovery procedure 310. In a CV2X system, a host UE 104a may not have information regarding the other UEs 104 with which the host UE 104a may want to communicate. By using the preconfigured discovery resource, the UEs 104 may limit a search space for discovering other UEs 104 and reduce overhead associated with discovery signals. Further, the discovery signals may reduce overhead by limiting discovery signal transmission unless a UE 104 receives an indication that a device is present that is interested in receiving the discovery signal. The discovery signals utilizing the preconfigured discovery resources may include a discovery preamble 312, a query 314, a discovery message 316, and a RACH preamble 318. The RACH preamble 318 may also be referred to as a RACH Message 1.

The discovery preamble 312 may be a transmission from a host UE 104a indicating that the host UE 104a is capable of communicating (e.g., offering a service). For example, the discovery preamble 312 may be one predefined sequence selected from a set of predefined sequences. The selection of the predefined sequence may convey a limited amount of information. For example, the discovery preamble 312 may be selected based on a type of the host UE 104a or a type of service offered by the host UE 104a. As discussed in further detail below, the host UE 104a may transmit the discovery preamble 312 using discovery preamble resources within the preconfigured discovery resources. The host UE 104a may select which beams to use for the discovery preamble to attempt to reach potentially interested devices.

The query 314 may be a transmission from a client UE 104b indicating that the client UE 104b is interested in obtaining further information from the host UE 104a. For example, the query 314 may be a preamble or other defined sequence transmitted by the client UE 104b on query resources corresponding to the discovery preamble resources. The client UE 104b may transmit the query 314 on the corresponding query resources upon receiving a discovery preamble in which the client UE 104b is interested. For example, the client UE 104b may transmit the query 314 in response to one or more preambles indicating certain types of devices or services. The client UE 104b may use beamforming for the query 314 based on the received discovery preamble 312 (e.g., using channel estimation and beam training). The host UE 104a may listen for queries 314 on the corresponding query resources.

The discovery message 316 may be a transmission from the host UE 104a providing information regarding one or more services offered by the host UE 104a. The host UE 104a may transmit the discovery message 316 in response to receiving the query 314. The discovery message 316 may include more information than the discovery preamble 312 and may be transmitted using beamforming based on the query 314. For example, the discovery message 316 may include details regarding the service offered by the host UE 104a. By transmitting the larger portion of the discovery information in the discovery message 316 only in response to the query 314, the host UE 104a may limit the discovery resources used. In an aspect, resources designated for transmission of a discovery message 316 may be repurposed (e.g., used for data for an existing connection) when the discovery message 316 is not transmitted. Additionally, since beamforming of the discovery message 316 may be based on the query 314, the host UE 104a may avoid repetitions of the discovery message 316 on multiple beams, further reducing the resources used for discovery.

The host UE 104a and client UE 104b may complete a RACH procedure following the discovery procedure discussed above. Alternatively, a CV2X RACH procedure may follow other discovery procedures. The RACH procedure may include a RACH preamble 318 (RACH Message 1), RACH message 2 320, RACH message 3 322, and RACH message 4 324.

The RACH preamble 318 may be a transmission from the client UE 104b seeking to establish communications with the host UE 104a. The RACH preamble 318 may also be referred to as a RACH message 1 and may perform a similar role as a conventional RACH message 1.

RACH message 2 320 may be transmitted by the host UE 104a in response to the RACH preamble 318 to indicate resources to be used by the client UE 104b for sending RACH message 3 322 and for receiving RACH message 4 324. RACH message 3 322 may be transmitted by the client UE 104b and may include a control channel and a data channel providing identification information for the client UE 104b. RACH message 4 324 may set up an RRC connection between the host UE 104*a* and the client UE 104*b* that may be used for further communications.

Figure 4:
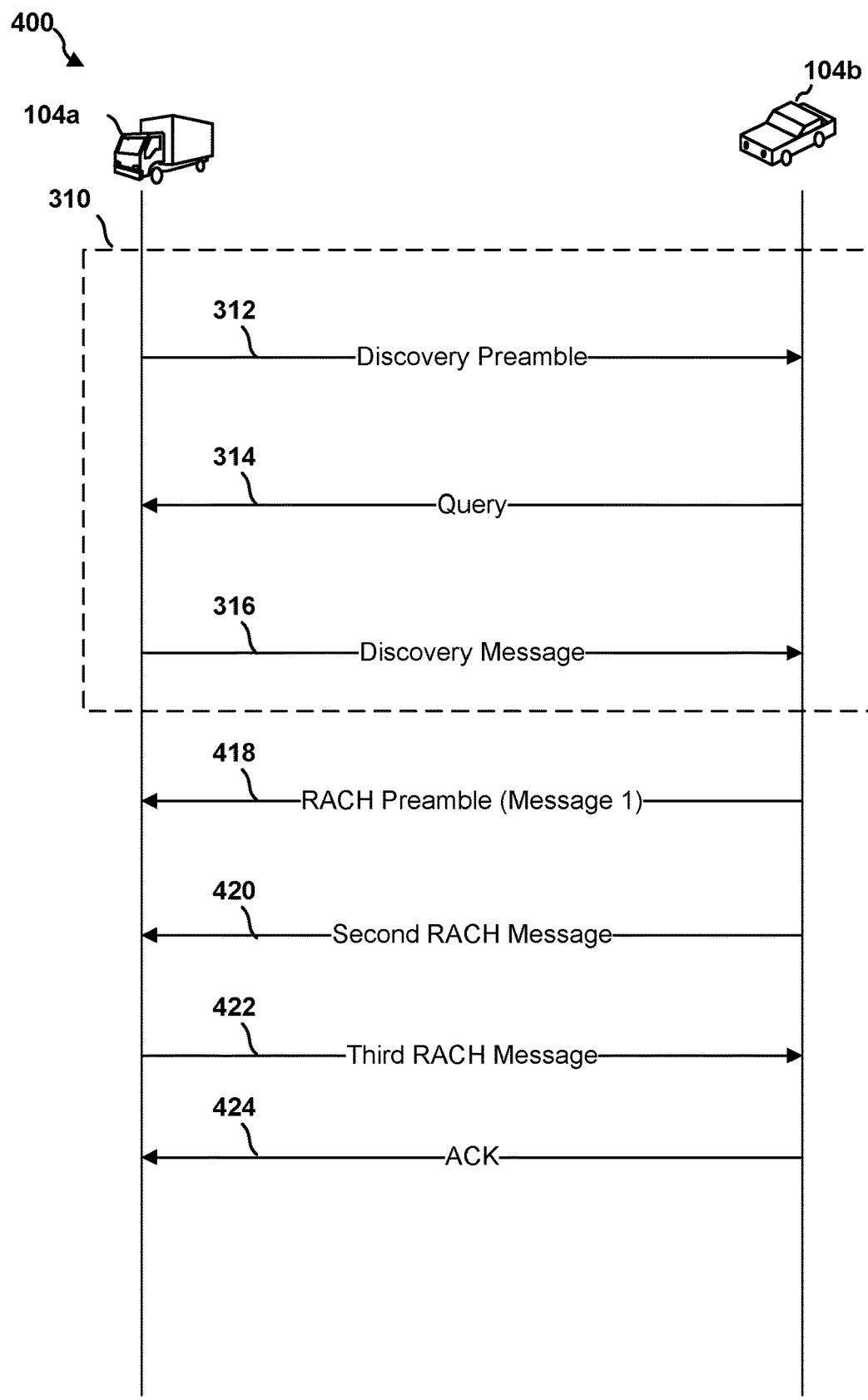
FIG. 4 is a message diagram showing an example alternative random access procedure for CV2X.

FIG. 4 is a message diagram 400 illustrating example signals that may be used for discovery and connection establishment between the host UE 104*a* and the client UE 104*b* using an alternative RACH procedure. The discovery procedure 310 may be used for the alternative RACH procedure. That is, a discovery procedure 310 may include the discovery preamble 312, the query 314, and the discovery message 316. Alternatively, an alternative CV2X RACH procedure may follow other discovery procedures.

The client UE 104*b* may transmit the RACH preamble 418 on selected resources. In an aspect, the discovery message 316 may indicate available time and frequency domain resources. The client UE 104*b* may select resources from the available time and frequency domain resources to transmit the RACH preamble 418. The RACH preamble 418 may be a predefined sequences. A standards organization may define a set of RACH preamble sequences. The client UE 104*b* may select a RACH preamble sequence to use for the RACH preamble 418.

The client UE 104*b* may subsequently transmit a second RACH message 420 using a time domain resource that is after the time domain resource for the RACH preamble. The second RACH message 420 may use a defined resources and a configuration. The resources may include a combination of time domain resources and frequency domain resources. In an aspect, the time domain resource for the second RACH message 420 may be based on a mapping from the time domain resource of the RACH preamble 418. That is, after transmitting the RACH preamble 418, the client UE 104*b* may transmit the second RACH message 420 at a defined time or within a defined window with respect to the time domain resource of the RACH preamble 418. For example, the mapping may be one-to-one and define a fixed time after the RACH preamble 418 for the second RACH message 420. As another example, the mapping may be one-to-many and define a time domain window within which the second RACH message 420 may be transmitted in a subset of resources. In the case of a one-to-many mapping, the host UE 104*a* may monitor for the second RACH message 420 within the defined window. In an aspect, a time gap between the RACH preamble 418 and second RACH message 420 may be relatively large. For example, the time gap may be at least two slots. A relatively large time gap may allow the host UE 104*a* to repurpose resources allocated to the second RACH message if the host UE 104*a* does not detect any RACH preamble 418. Since the host UE 104*a* may not need to monitor for the second RACH message 420, the host UE 104*a* may instead schedule another transmission on resources allocated for a second RACH message 420 after resources allocated for RACH preamble 418.

The frequency domain resources may be indicated by a one-to-many mapping. The client UE 104*b* may select from among a set of frequency domain resources. Accordingly, multiple client UEs 104*b* may transmit a second RACH message 420 using different resources to avoid collisions. For example, each client UE 104*b* may select a frequency domain resource based on an identifier of the respective client UE 104*b*. In another example, each client UE 104*b* may select frequency domain resources based on estimated congestion.

The configuration may include any of sub-carrier spacing (SCS), modulation and coding scheme (MCS), Tx power control, beam-related information, quasi-co-location (QCL) assumption, resource and configuration of the corresponding reference signals (e.g., demodulation reference signal (DMRS)), and/or hybrid automatic repeat request (HARQ) related information. The resource and configuration may be provided by the discovery message 316 transmitted by the host UE 104*a*. The resource and configuration may be preconfigured in a standards document (e.g., as a standardized preconfiguration). The standards document may indicate the time domain mapping from the RACH preamble 418. The standards document may designate the frequency domain resources and the configuration. In an aspect, the standards document may provide a table of resource and configuration combinations associated with an index or a preamble sequence. A third entity such as a network entity or scheduling entity may indicate the resources and configuration, for example, by transmitting an index to the host UE 104*a* and the client UE 104*b*. In another aspect, the resources and configuration may be based at least in part on the RACH preamble 418. For example, the resources and configuration may mapped to an index associated with the resource used for the RACH preamble 418 or the sequence of the RACH preamble 418.

The host UE 104*a* may transmit a third RACH message 422 to the client UE 104*b*. The third RACH message 422 may set up an RRC connection between the host UE 104*a* and the client UE 104*b* that may be used for further communications. For example, the third RACH message 422 may include an identifier of the host UE 104*a* and information about resources and configuration for subsequent messages. The resources and configuration for the third RACH message 422 may be provided in any combination of: the discovery message transmitted by the host UE 104*a*, a standards document including preconfigured resources and configuration, an indication by a third entity (e.g. a centralized scheduling entity or a network entity), the RACH preamble 418 transmitted by UE 104*b* (thru choice of RACH MSG1 resources or the RACH MSG1 sequence), or the second RACH message 420.

For example, there may be a single resource allocated to transmission of the third RACH message 422. In an aspect, the second RACH message 420 may provide the grant for such resource. In another aspect, there may be multiple resources (in time domain and/or frequency domain) allocated for transmission of the third RACH message 422. Accordingly, the host UE 104*a* may choose a subset of the multiple resources, and the client UE 104*b* may monitor multiple resources for the third RACH message 422.

The client UE 104*b* may transmit an acknowledgment (ACK) 424 indicating that the third RACH message 422 was received. In an aspect, for example, the ACK 424 may be transmitted using the RRC channel established by the third RACH message 422.

Figure 5:
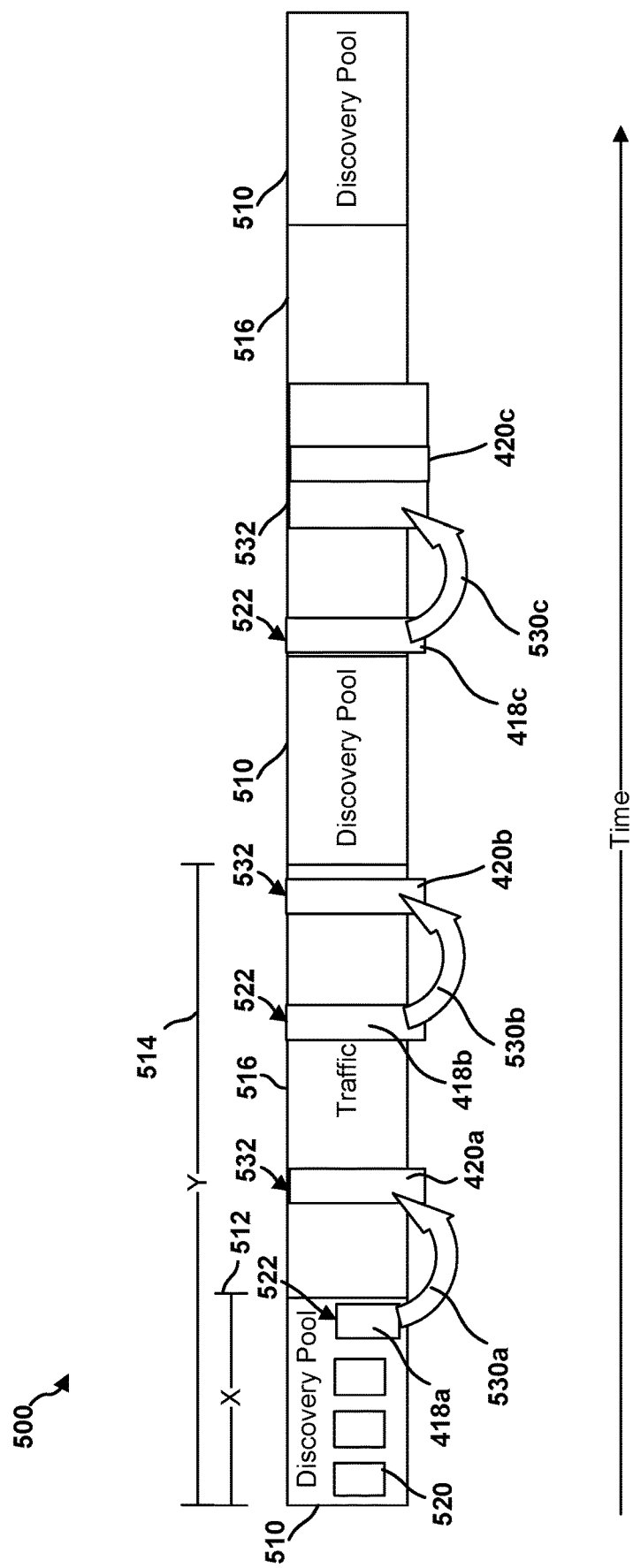
FIG. 5 is a resource diagram showing an example allocation of time domain resources for an alternative RACH procedure.

FIG. 5 is a resource diagram 500 showing resource allocation for an alternative RACH procedure. In an aspect, the time domain may be divided into time domain resources referred to as slots. As used herein, the term slot may refer to a smallest allocation of time domain resources for a radio access technology. A slot may include multiple symbol periods that may be allocated to the same transmitter/receiver for a communication. In an aspect, a discovery procedure 310 may utilize preconfigured discovery resources allocated across multiple communications networks. For example, the preconfigured discovery resources may be specified by a regulatory agency or a standards setting organization. In another aspect, the preconfigured discovery resources may be allocated by a network operator on a licensed portion of spectrum. For example, the base stations 102 or another network entity may transmit an indication of the preconfigured discovery resources as system information. In another aspect, the preconfigured resources may be allocated by a regulatory agency or standards setting organization within a particular portion of a network operator's licensed spectrum. For example, a standard may define a lowest frequency portion of the network operator's licensed spectrum to periodically be used as the preconfigured discovery resources.

As illustrated in FIG. 5, the preconfigured discovery resources may include discovery pools 510 that may be allocated a constant bandwidth in the frequency-domain and periodically allocated in the time-domain. A discovery pool may be defined by a duration X 512 and a periodicity Y 514. Traffic resources 516 may be time and frequency domain resources located in the time domain between the discovery pools 510 that are used to carry data traffic. In an aspect, the periodicity Y 514 may be a multiple of the duration X 512. For example, the duration X 512 may be 1 second and the periodicity Y 514 may be 10 or 20 seconds.

The discovery pools 510 may include discovery bursts 520. A discovery burst 520 may be a set of resources including resources allocated for each of discovery preamble 312, query 314, and discovery message 316. In an aspect, the RACH preamble 418 may also be transmitted using first time domain resources 522 within the discovery pool 510. In another aspect, the RACH preamble 418 may utilize any first time domain resources 522 specified by the discovery message 316, for example, time domain resources within traffic 516. A mapping 530 may specify second time domain resources 532 for carrying the second RACH message 420. The mapping 530 may specify second time domain resources 532 that are at least two slots after the first time domain resource 522.

In a first example, a RACH preamble 418a may be located in the discovery pool 510, which may be a first time domain resource 522. A second RACH message 420a may utilize a second time domain resource 532 mapped from the RACH preamble 418a by a mapping 530a. In a second example, a RACH preamble 418b may be transmitted during traffic 516, which may be configured, for example, by a discovery message 316. The second RACH message 420b may be transmitted using second time domain resources 532 determined by a mapping 530b. In a third example, a RACH preamble 418b may be mapped to multiple time domain resources 532 for the second RACH message 420c by a mapping 530c. The client UE 104b may select a time within the multiple time domain resources 532 for transmitting second RACH message 420c.

Figure 6:
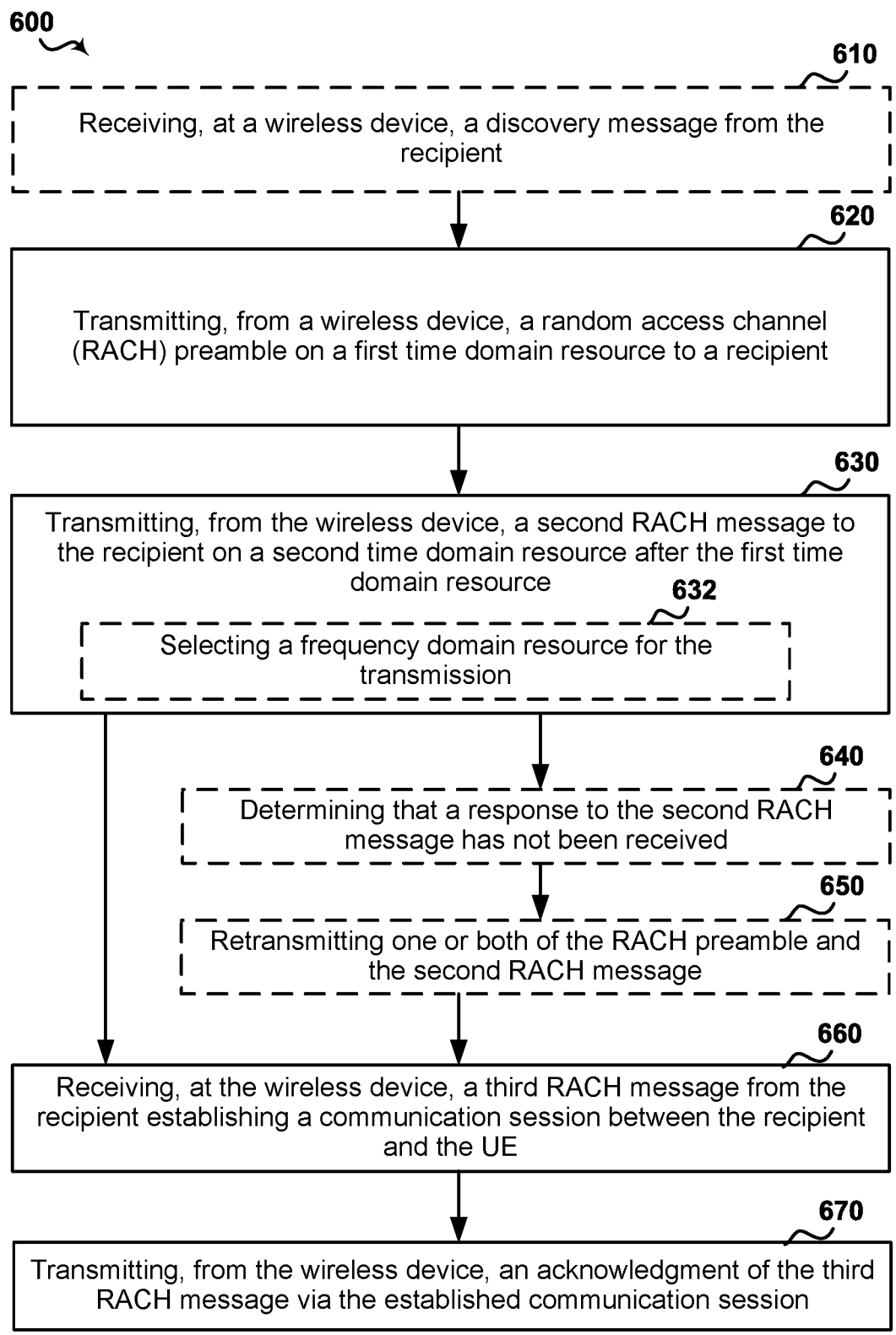
FIG. 6 is a flowchart of an example method of wireless communication by a host UE or base station.

FIG. 6 is a flowchart of a method 600 of wireless communication for a wireless device such as the client UE 104b in a CV2X system. The method 600 may be performed by an apparatus such as the client RACH component 196 in conjunction with the processor 812 of the client UE 104b. Optional blocks are shown in dashed lines.

At block 610, the method 600 may include receiving, at a wireless device, a discovery message from a recipient. In an aspect, for example, the client RACH component 196, at a client UE 104b, may execute the client discovery component 830 in conjunction with a receiver (e.g., receiver 806) to receive a discovery message 316 from a recipient, which may be a host UE 104a. The discovery message 316 may include information regarding the host UE 104a such as available RACH resources.

At block 620, the method 600 may include transmitting, from the wireless device, a RACH preamble on a first time domain resource to the recipient. In an aspect, for example, the client RACH component 196 may execute the client preamble component 832 in conjunction with a transmitter (e.g., transmitter 808) to transmit, from the client UE 104b, the RACH preamble 418 on the first time domain resource 522 to the recipient (e.g. host UE 104a). The first time domain resource 522 may be selected from available RACH resources, for example, as indicated in the discovery message 316. The client RACH component 196 may transmit the RACH preamble 418 in response to the discovery message 316 received in block 610.

In block 630, the method 600 may include transmitting, from the wireless device, a second RACH message on a second time domain resource after the first time domain resource to the recipient. In an aspect, for example, the client RACH component 196 may execute the client message component 834 in conjunction with the transmitter 808 to transmit, from the client UE 104b, the second RACH message 420 to the recipient on the second time domain resource 532 after the first time domain resource 522. The second time domain resource 532 being defined by a mapping 530 from the first time domain resource 522. The second RACH message 420 may include one or more of: an identifier of the wireless device; an identifier of the recipient of the second RACH message; a resource configuration for subsequent RACH messages; or timing information. In an aspect, at block 632, the block 630 may include selecting a frequency domain resource for the transmission. For example, the client RACH component 196 may execute the client message component 834 select the frequency domain resource for the transmission from a set of frequency domain resources. For instance, the client message component 834 may select the frequency domain resources based on an identifier of the client UE 104b to avoid collisions with messages from other client UEs.

In block 640, the method 600 may include determining that a response to the second RACH message has not been received. In an aspect, for example, the client RACH component 196 may execute the retransmission component 836 to determine that the response to the second RACH message 420 has not been received. For example, the retransmission component 836 may determine that the response to the second RACH message 420 has not been received when resources monitored for the response do not decode to a response.

In block 650, the method 600 may include retransmitting one or both of the RACH preamble and the second RACH message. In an aspect, for example, the client RACH component 196 may execute the retransmission component 836 in conjunction with the transmitter 808 to retransmit one or both of the RACH preamble 418 and the second RACH message 420 in response to determining that a response to the second RACH message 420 has not been received. Since the client UE 104b transmits both the RACH preamble 418 and the second RACH message 420 with no intervening message from the host UE 104a, the client UE 104b may not know whether one or both of the messages was not received. Accordingly, the client UE 104b may retransmit both messages. In another aspect, a retransmission resource may be determined based on the second time domain resource 532 for the second RACH message 420, and the client UE 104b may attempt to retransmit only the second RACH message 420. In another aspect, the client UE 104b may use a RACH procedure illustrated in FIG. 3 to retransmit the RACH preamble.

The client RACH component 196 may execute the retransmission component 836 to retransmit the RACH preamble 418 or the second RACH message 420 a configured maximum number of times, K. The client RACH component 196 may select a different transmit power for the retransmission. For example, the client RACH component 196 may ramp up the transmit power for each retransmission by an amount, S, while capping the transmit power to a maximum transmit power, Pmax. The client RACH component 196 may use a different set of frequency domain resources for one or more retransmissions. For example, the selection of frequency domain resources for the retransmission may be random, pseudo-random, depend on an ID of the client UE 104b, or based on a measurement of the available resources to choose a less congested resource. In another aspect, the client RACH component 196 may use the same beam or a different beam for its retransmissions. For example, the UE 104b may retransmit using additional TX beams around and close to an initial transmit beam. For instance, referring back to FIG. 2, if the UE 104b initially used beam 204c, for the retransmission, the UE 104b may use beams 204b and/or 204d. The configuration for retransmission (including e.g., K, S, Pmax, and/or beam configuration) may be preconfigured, indicated in a discovery message 416, indicated by a third entity, and/or any combination of these.

In block 660, the method 600 may include receiving, at the wireless device, a third RACH message from the recipient establishing a communication session between the recipient and the UE. In an aspect, for example, the client RACH component 196 may execute the client message component 834 in conjunction with the receiver 806 to receive, at the client UE 104b, the third RACH message 422 from the host UE 104a. The client message component 834 may establish the communication session between the client UE 104b and the host UE 104a based on the third RACH message 422.

In block 670, the method 600 may include transmitting, from the wireless device, an acknowledgment of the third RACH message via the established communication session. In an aspect, for example, the client RACH component 196 may execute the client message component 834 in conjunction with the transmitter 808 to transmit, from the client UE 104b, an ACK 424 of the third RACH message 422 via the established communication session.

Figure 7:
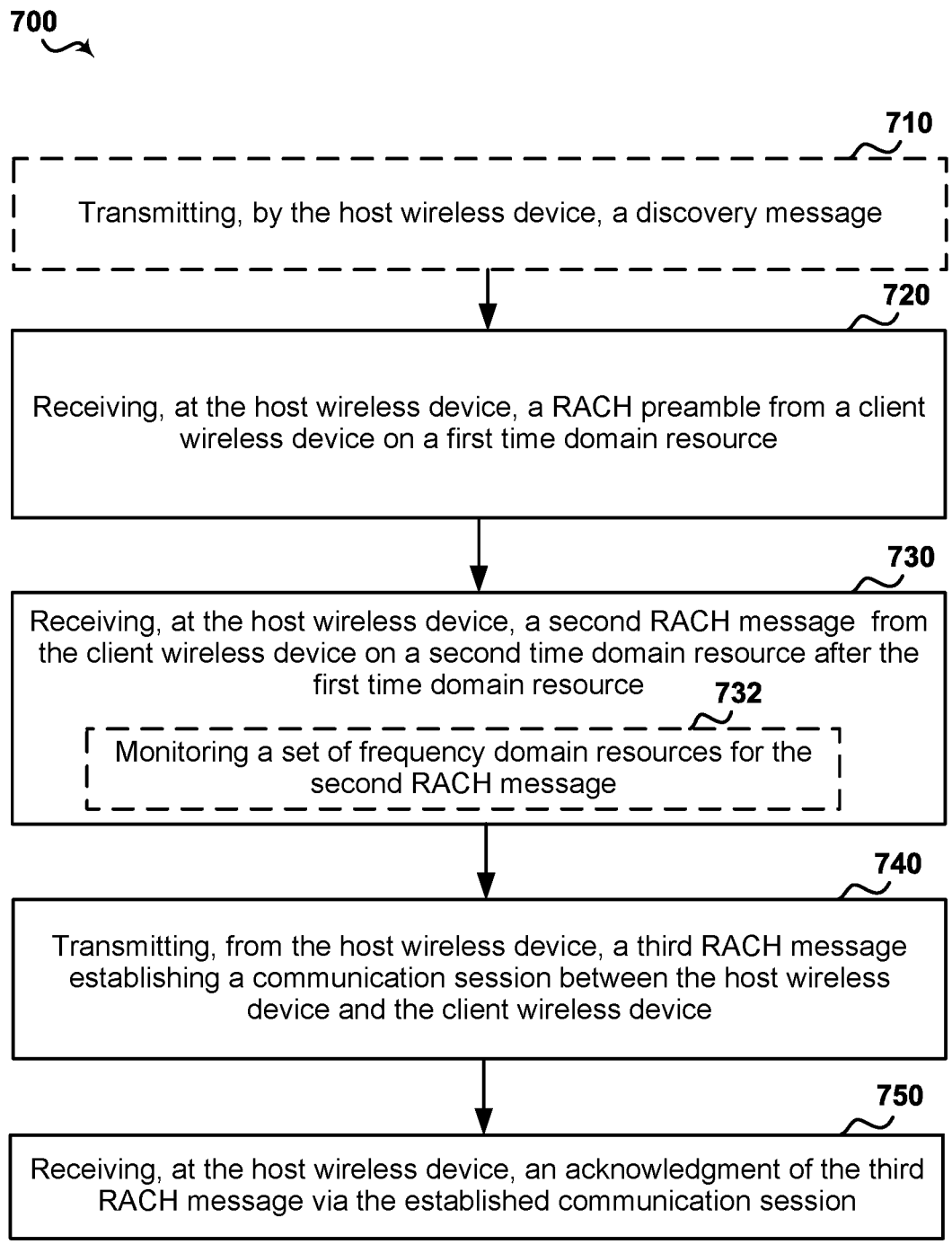
FIG. 7 is a flowchart of an example method of wireless communication by a client UE.

FIG. 7 is a flowchart of a method 700 of wireless communication for a host wireless device such as the UE 104a or a base station 102 in a CV2X system. The method 700 may be performed by an apparatus such as the host RACH component 194 of the host UE 104a. The method 700 may be performed in conjunction with the method 800 being performed by a client UE 104b. Optional blocks are shown in dashed lines.

In block 710, the method 700 may include transmitting, by the host wireless device, a discovery message. In an aspect, for example, the host RACH component 194 at host UE 104a may execute the host discovery component 820 in conjunction with the transmitter 808 to transmit the discovery message 316.

In block 720, the method 700 may include receiving, at the host wireless device, a RACH preamble on a first time domain resource from a client UE. In an aspect, for example, the host RACH component 194 may execute the host preamble component 822 in conjunction with the receiver 806 to receive the RACH preamble 418 on the first time domain resource 522 from the client UE 104b.

In block 730, the method 700 may include receiving, at the host wireless device, a second RACH message from the client wireless device on a second time domain resource after the first time domain resource. In an aspect, for example, the host RACH component 194 may execute the host message component 824 in conjunction with the receiver 806 to receive the second RACH message 420 from the client UE 104b on a second time domain resource 532 after the first time domain resource 522. The second time domain resource 532 being defined by a mapping 530 from the first time domain resource 522. In block 732, the block 730 may include monitoring a set of frequency domain resources for the second RACH message. In an aspect, for example, the host RACH component 194 may execute the host message component 824 to monitor the set of frequency domain resources for the second RACH message.

In block 740, the method 700 may include transmitting, from the host wireless device, a third RACH message establishing a communication session between the host wireless device and the client wireless device. In an aspect, for example, the host RACH component 194 may execute the client message component 834 in conjunction with the transmitter 808 to transmit the third RACH message establishing the communication session between the host UE 104a and the client UE 104b.

In block 750, the method 700 may include receiving, at the host wireless device, an acknowledgment of the third RACH message via the established communication session. In an aspect, for example, the host RACH component 194 may receive the ACK 424 of the third RACH message 422 via the established communication session.

Referring to FIG. 8, one example of an implementation of UE 104 may include a variety of components, some of which have already been described above, but including components such as one or more processors 812 and memory 816 and transceiver 802 in communication via one or more buses 844, which may operate in conjunction with modem 814, host RACH component 194 and client RACH component 196 to enable one or more of the functions described herein related to RACH procedures for CV2X Further, the one or more processors 812, modem 814, memory 816, transceiver 802, RF front end 888 and one or more antennas 865, may be configured to support voice and/or data calls (simultaneously or non-simultaneously) in one or more radio access technologies.

In an aspect, the one or more processors 812 may include a modem 814 that uses one or more modem processors. The various functions related to host RACH component 194 and client RACH component 196 may be included in modem 814 and/or processors 812 and, in an aspect, may be executed by a single processor, while in other aspects, different ones of the functions may be executed by a combination of two or more different processors. For example, in an aspect, the one or more processors 812 may include any one or any combination of a modem processor, or a baseband processor, or a digital signal processor, or a transmit processor, or a receiver processor, or a transceiver processor associated with transceiver 802. In other aspects, some of the features of the one or more processors 812 and/or modem 814 associated with host RACH component 194 and client RACH component 196 may be performed by transceiver 802.

The host discovery component 820 may include hardware, firmware, and/or executable software stored in a computer-readable medium for advertising services and configurations during a discovery procedure. For example, the host discovery component 820 may be configured to generate and transmit a discovery message identifying the services and/or configurations.

The host preamble component 822 may include hardware, firmware, and/or executable software stored in a computer-readable medium for receiving a RACH preamble. For example, the host preamble component 822 may include or control an RF receiver for receiving the RACH preamble.

The host message component 824 may include hardware, firmware, and/or executable software stored in a computer-readable medium for receiving a second RACH message and for transmitting a third RACH message. For example, the host message component 824 may include or control an RF receiver for receiving the second RACH message and for transmitting the third RACH message. The host message component 824 may also include a decoder for decoding the second RACH message and an encoder for encoding the third RACH message.

The client discovery component 830 may include hardware, firmware, and/or executable software stored in a computer-readable medium for receiving a discovery message from the host UE 104a during a discovery procedure. For example, the client discovery component 830 may include or control an RF receiver for receiving the discovery message. The client discovery component 830 may also include a decoder for decoding the discovery message and determining an advertised service and/or configuration.

The client preamble component 832 may include hardware, firmware, and/or executable software stored in a computer-readable medium for transmitting a RACH preamble. For example, the client preamble component 832 may include or control an RF transmitter for transmitting the RACH preamble.

The client message component 834 may include hardware, firmware, and/or executable software stored in a computer-readable medium for transmitting a second RACH message. For example, the client message component 834 may include or control an RF transmitter for transmitting the second RACH message. The client message component 834 may also include an encoder for encoding the second RACH message. The client message component 834 may also be configured to determine a time domain resource of the second RACH message based on a mapping from the timing of the RACH preamble.

The retransmission component 836 may include hardware, firmware, and/or executable software stored in a computer-readable medium for receiving a third RACH message from the host UE 104a and retransmitting the RACH preamble or second RACH message in response to determining that the third RACH message is not received. For example, the retransmission component 836 may include or control an RF receiver for receiving the third RACH message. The retransmission component 836 may also include or control an RF transmitter for retransmitting the RACH preamble or second RACH message in response to determining that the third RACH message is not received.

Also, memory 816 may be configured to store data used herein and/or local versions of applications 875, host RACH component 194, client RACH component 196 and/or one or more of subcomponents thereof being executed by at least one processor 812. Memory 816 may include any type of computer-readable medium usable by a computer or at least one processor 812, such as random access memory (RAM), read only memory (ROM), tapes, magnetic discs, optical discs, volatile memory, non-volatile memory, and any combination thereof. In an aspect, for example, memory 816 may be a non-transitory computer-readable storage medium that stores one or more computer-executable codes defining host RACH component 194, client RACH component 196 and/or one or more of subcomponents thereof, and/or data associated therewith, when UE 104 is operating at least one processor 812 to execute host RACH component 194 and client RACH component 196 and/or one or more subcomponents thereof.

Transceiver 802 may include at least one receiver 806 and at least one transmitter 808. Receiver 806 may include hardware, firmware, and/or software code executable by a processor for receiving data, the code comprising instructions and being stored in a memory (e.g., computer-readable medium). Receiver 806 may be, for example, a radio frequency (RF) receiver. In an aspect, receiver 806 may receive signals transmitted by at least one base station 102 or another UE 104. Additionally, receiver 806 may process such received signals, and also may obtain measurements of the signals, such as, but not limited to, Ec/Io, SNR, RSRP, RSSI, etc. Transmitter 808 may include hardware, firmware, and/or software code executable by a processor for transmitting data, the code comprising instructions and being stored in a memory (e.g., computer-readable medium). A suitable example of transmitter 808 may include, but is not limited to, an RF transmitter.

Moreover, in an aspect, UE 104 may include RF front end 888, which may operate in communication with one or more antennas 865 and transceiver 802 for receiving and transmitting radio transmissions, for example, wireless communications transmitted by at least one base station 102 or wireless transmissions transmitted by UE 104. RF front end 888 may be connected to one or more antennas 865 and may include one or more low-noise amplifiers (LNAs) 890, one or more switches 892, one or more power amplifiers (PAs) 898, and one or more filters 896 for transmitting and receiving RF signals.

In an aspect, LNA 890 may amplify a received signal at a desired output level. In an aspect, each LNA 890 may have a specified minimum and maximum gain values. In an aspect, RF front end 888 may use one or more switches 892 to select a particular LNA 890 and an associated specified gain value based on a desired gain value for a particular application.

Further, for example, one or more PA(s) 898 may be used by RF front end 888 to amplify a signal for an RF output at a desired output power level. In an aspect, each PA 898 may have specified minimum and maximum gain values. In an aspect, RF front end 888 may use one or more switches 892 to select a particular PA 898 and its specified gain value based on a desired gain value for a particular application.

Also, for example, one or more filters 896 may be used by RF front end 888 to filter a received signal to obtain an input RF signal. Similarly, in an aspect, for example, a respective filter 896 may be used to filter an output from a respective PA 898 to produce an output signal for transmission. In an aspect, each filter 896 may be connected to a specific LNA 890 and/or PA 898. In an aspect, RF front end 888 may use one or more switches 892 to select a transmit or receive path using a specified filter 896, LNA 890, and/or PA 898, based on a configuration as specified by transceiver 802 and/or processor 812.

As such, transceiver 802 may be configured to transmit and receive wireless signals through one or more antennas 865 via RF front end 888. In an aspect, transceiver may be tuned to operate at specified frequencies such that UE 104 may communicate with, for example, one or more base stations 102 or one or more cells associated with one or more base stations 102. In an aspect, for example, modem 814 may configure transceiver 802 to operate at a specified frequency and power level based on the UE configuration of the UE 104 and the communication protocol used by modem 814.

In an aspect, modem 814 may be a multiband-multimode modem, which may process digital data and communicate with transceiver 802 such that the digital data is sent and received using transceiver 802. In an aspect, modem 814 may be multiband and be configured to support multiple frequency bands for a specific communications protocol. In an aspect, modem 814 may be multimode and be configured to support multiple operating networks and communications protocols. In an aspect, modem 814 may control one or more components of UE 104 (e.g., RF front end 888, transceiver 802) to enable transmission and/or reception of signals from the network based on a specified modem configuration. In an aspect, the modem configuration may be based on the mode of the modem and the frequency band in use. In another aspect, the modem configuration may be based on UE configuration information associated with UE 104 as provided by the network during cell selection and/or cell reselection.

Figure 9:
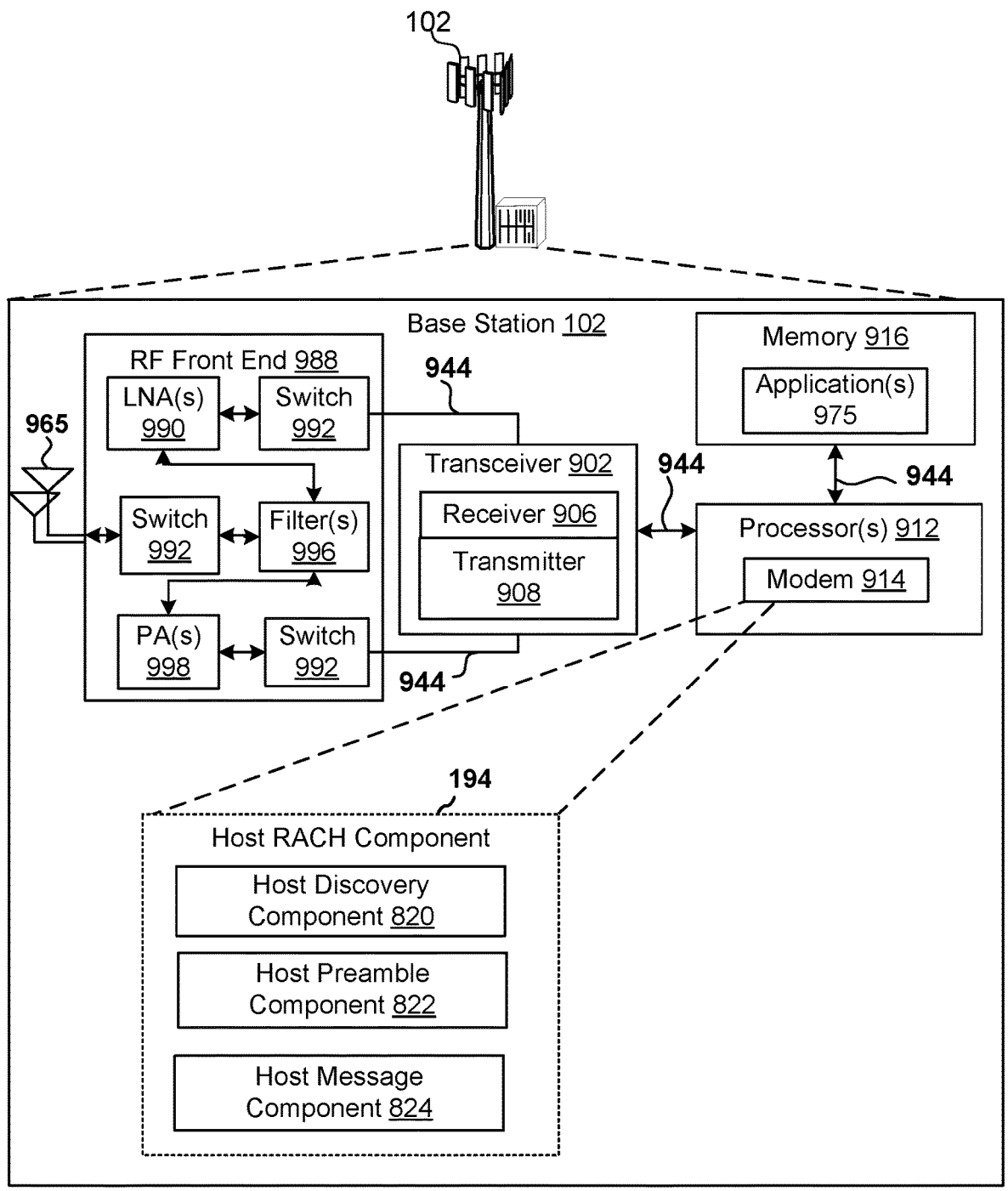
FIG. 9 is a schematic diagram of example components of the base station of FIG. 1.

Referring to FIG. 9, one example of an implementation of base station 102 may include a variety of components, some of which have already been described above, but including components such as one or more processors 912 and memory 916 and transceiver 902 in communication via one or more buses 944, which may operate in conjunction with modem 914 and host RACH component 194 to enable one or more of the functions described herein related to an alternative RACH procedure.

The transceiver 902, receiver 906, transmitter 908, one or more processors 912, memory 916, applications 975, buses 944, RF front end 988, LNAs 990, switches 992, filters 996, PAs 998, and one or more antennas 965 may be the same as or similar to the corresponding components of UE 104, as described above, but configured or otherwise programmed for base station operations as opposed to UE operations.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

Some Further Example Embodiments

An example method of wireless communication, comprising: transmitting, from a wireless device, a random access channel (RACH) preamble on a first time domain resource to a recipient; and transmitting, from the wireless device, a second RACH message to the recipient on a second time domain resource after the first time domain resource, the second time domain resource being defined by a mapping from the first time domain resource.

The above example method, wherein the second RACH message includes one or more of: an identifier of the wireless device; an identifier of the recipient of the second RACH message; a resource configuration for subsequent RACH messages; or timing information.

One or more of the above example methods, wherein the timing information is one of a timing offset between the wireless device and the recipient of the second RACH message or a timing reference for a subsequent RACH message.

One or more of the above example methods, further comprising receiving a discovery message from the recipient, wherein transmitting the second RACH message is in response to receiving the discovery message from the recipient.

One or more of the above example methods, wherein the discovery message indicates the mapping for the second time domain resource and a configuration for the second RACH message.

One or more of the above example methods, wherein the mapping for the second time domain resource and a configuration for the second RACH message are provided by one of: a standardized preconfiguration; a configuration indicated by a third entity in communication with both the wireless device and the recipient; or a configuration indicated by a selected resource or sequence of the RACH preamble.

One or more of the above example methods, wherein the mapping for the second time domain resource is a one-to-one mapping or the mapping indicates a time domain window in which the second time domain resource is selected by the wireless device.

One or more of the above example methods, wherein transmitting the second RACH message comprises selecting a frequency domain resource for the second RACH message.

One or more of the above example methods, wherein the second time domain resource is at least two slots after the first time domain resource.

One or more of the above example methods, wherein no message is received from the recipient between the RACH preamble and the second RACH message.

One or more of the above example methods, further comprising receiving, at the wireless device, a third RACH message from the recipient establishing a communication session between the recipient and the wireless device.

One or more of the above example methods, wherein a resource and configuration of the third RACH message is provided by one of: a discovery message transmitted by the recipient; a standardized preconfiguration; a configuration indicated by a third entity in communication with both the wireless device and the recipient; a configuration indicated by a selected resource or sequence of the RACH preamble; or the second RACH message.

One or more of the above example methods, further comprising determining that a response to the second RACH message has not been received; and retransmitting one or both of the RACH preamble and the second RACH message.

One or more of the above example methods, further comprising: receiving, at the wireless device as a host device, a third RACH preamble on a third time domain resource from second client wireless device; and receiving, at the wireless device, a fourth RACH message from the second client wireless device on a fourth time domain resource after the third time domain resource, the fourth time domain resource being defined by the mapping from the third time domain resource.

An example device (e.g., UE) comprising a transceiver, a memory configured to store instructions, and one or more processors communicatively coupled with the transceiver and the memory, wherein the one or more processors are configured to perform all or part of one or more of the above example methods.

An example apparatus for use in a device (e.g., UE) comprising means for wireless communication, means for storing instructions and data, and means for performing all or part of one or more of the above example methods.

A second example method of wireless communications for a host wireless device, comprising: receiving, at a host wireless device, a random access channel (RACH) preamble on a first time domain resource from a client wireless device; and receiving, at the host wireless device, a second RACH message from the client wireless device on a second time domain resource after the first time domain resource, the second time domain resource being defined by a mapping from the first time domain resource.

The second example method as above, wherein the second RACH message includes one or more of: an identifier of the client wireless device; an identifier of the host wireless device; a resource configuration for subsequent RACH messages; or timing information.

One or more of the second example methods as above, wherein the timing information is one of a timing offset between the client wireless device and the host wireless device or a timing reference for a subsequent RACH message.

One or more of the second example methods as above, further comprising transmitting, by the host wireless device, a discovery message, wherein receiving the second RACH message is in response to transmitting the discovery message.

One or more of the second example methods as above, wherein the discovery message indicates the mapping for the second time domain resource.

One or more of the second example methods as above, wherein the mapping for the second time domain resource and a configuration for the second RACH message are provided by one of: a standardized preconfiguration; a configuration indicated by a third entity in communication with both the host wireless device and the client wireless device; or a configuration indicated by a selected resource or sequence of the RACH preamble.

One or more of the second example methods as above, wherein the mapping for the second time domain resource is a one-to-one mapping or the mapping indicates a time domain window in which the second time domain resource is selected by the client wireless device.

One or more of the second example methods as above, wherein receiving the second RACH message comprises monitoring a set of frequency domain resources for the second RACH message.

One or more of the second example methods as above, wherein the second time domain resource is at least two slots after the first time domain resource.

One or more of the second example methods as above, further comprising transmitting, from the host wireless device, a third RACH message establishing a communication session between the host wireless device and the client wireless device.

One or more of the second example methods as above, wherein a resource and configuration of the third RACH message is provided by one of: a discovery message transmitted by the host wireless device; a standardized preconfiguration; a configuration indicated by a third entity in communication with both the host wireless device and the client wireless device; a configuration indicated by a selected resource or sequence of the RACH preamble; or the second RACH message.

Another example device (e.g., a host wireless device) comprising a transceiver, a memory configured to store instructions, and one or more processors communicatively coupled with the transceiver and the memory, wherein the one or more processors are configured to perform all or part of one or more of the above second example methods.

Another example apparatus for use in a device (e.g., a host wireless device) comprising means for wireless communication, means for storing instructions and data, and means for performing all or part of one or more of the above second example methods.

What is claimed is:

1. A method of wireless communication, comprising:
   receiving a discovery message from a recipient;
   transmitting, from a wireless device, a random access channel (RACH) preamble on a first time domain resource to the recipient; and
   transmitting, from the wireless device, a second RACH message to the recipient on a second time domain resource after the first time domain resource, the second time domain resource being defined by a mapping from the first time domain resource, wherein transmitting the second RACH message is in response to receiving the discovery message from the recipient.

2. The method of claim 1, wherein the second RACH message includes one or more of:
   an identifier of the wireless device;
   an identifier of the recipient of the second RACH message;
   a resource configuration for subsequent RACH messages; or
   timing information.

3. The method of claim 2, wherein the timing information is one of a timing offset between the wireless device and the recipient of the second RACH message or a timing reference for a subsequent RACH message.

4. The method of claim 1, wherein the discovery message indicates the mapping for the second time domain resource and a configuration for the second RACH message.

5. The method of claim 1, wherein the mapping for the second time domain resource and a configuration for the second RACH message are provided by one of:
   a standardized preconfiguration;
   a configuration indicated by a third entity in communication with both the wireless device and the recipient; or
   a configuration indicated by a selected resource or sequence of the RACH preamble.

6. The method of claim 1, wherein the mapping for the second time domain resource is a one-to-one mapping or the mapping indicates a time domain window in which the second time domain resource is selected by the wireless device.

7. The method of claim 1, wherein transmitting the second RACH message comprises selecting a frequency domain resource for the second RACH message.

8. The method of claim 1, wherein the second time domain resource is at least two slots after the first time domain resource.

9. The method of claim 1, wherein no message is received from the recipient between the RACH preamble and the second RACH message.

10. The method of claim 1, further comprising receiving, at the wireless device, a third RACH message from the recipient establishing a communication session between the recipient and the wireless device.

11. The method of claim 10, wherein a resource and configuration of the third RACH message is provided by one of:
    a discovery message transmitted by the recipient;
    a standardized preconfiguration;
    a configuration indicated by a third entity in communication with both the wireless device and the recipient;
    a configuration indicated by a selected resource or sequence of the RACH preamble; or
    the second RACH message.

12. The method of claim 1, further comprising:
    determining that a response to the second RACH message has not been received; and
    retransmitting one or both of the RACH preamble and the second RACH message.

13. The method of claim 1, further comprising:
    receiving, at the wireless device as a host device, a third RACH preamble on a third time domain resource from second client wireless device; and
    receiving, at the wireless device, a fourth RACH message from the second client wireless device on a fourth time domain resource after the third time domain resource, the fourth time domain resource being defined by the mapping from the third time domain resource.

14. A client wireless device for wireless communication, comprising:
    a memory; and
    a processor in communication with the memory, wherein the processor is configured to:
    receive a discovery message from a recipient;
    transmit, from the client wireless device, a random access channel (RACH) preamble on a first time domain resource to a recipient; and
    transmit, from the wireless device, a second RACH message to the recipient on a second time domain resource after the first time domain resource, the second time domain resource being defined by a mapping from the first time domain resource, wherein the processor is configured to transmit the second RACH message in response to receiving the discovery message from the recipient.

15. The client wireless device of claim 14, wherein the second RACH message includes one or more of:
    an identifier of the client wireless device;
    an identifier of the recipient of the second RACH message;
    a resource configuration for subsequent RACH messages; or
    timing information.

16. The client wireless device of claim 15, wherein the timing information is one of a timing offset between the client wireless device and the recipient of the second RACH message or a timing reference for a subsequent RACH message.

17. The client wireless device of claim 14, wherein the discovery message indicates the mapping for the second time domain resource and a configuration for the second RACH message.

18. The client wireless device of claim 14, wherein the mapping for the second time domain resource and a configuration for the second RACH message are provided by one of:
    a standardized preconfiguration;
    a configuration indicated by a third entity in communication with both the client wireless device and the recipient; or
    a configuration indicated by a selected resource or sequence of the RACH preamble.

19. The client wireless device of claim 14, wherein the mapping for the second time domain resource is a one-to-one mapping or the mapping indicates a time domain window in which the second time domain resource is selected by the client wireless device.

20. The client wireless device of claim 14, wherein the processor is configured to select a frequency domain resource for the second RACH message.

21. The client wireless device of claim 14, wherein the second time domain resource is at least two slots after the first time domain resource.

22. The client wireless device of claim 14, wherein no message is received from the recipient between the RACH preamble and the second RACH message.

23. The client wireless device of claim 14, wherein the processor is configured to receive a third RACH message from the recipient establishing a communication session between the recipient and the client wireless device.

24. The client wireless device of claim 23, wherein a resource and configuration of the third RACH message is provided by one of:
    the discovery message transmitted by the recipient;
    a standardized preconfiguration;
    a configuration indicated by a third entity in communication with both the client wireless device and the recipient;
    a configuration indicated by a selected resource or sequence of the RACH preamble; or
    the second RACH message.

25. The client wireless device of claim 14, further comprising:
    determining that a response to the second RACH message has not been received; and
    retransmitting one or both of the RACH preamble and the second RACH message.

26. The client wireless device of claim 14, further comprising:
- receiving, at the client wireless device as a host device, a third RACH preamble on a third time domain resource from second client wireless device; and
- receiving, at the client wireless device, a fourth RACH message from the second client wireless device on a fourth time domain resource after the third time domain resource, the fourth time domain resource being defined by a mapping from the third time domain resource.

27. A client wireless device for wireless communication, comprising:
- means for receiving a discovery message from a recipient;
- means for transmitting, from the client wireless device, a random access channel (RACH) preamble on a first time domain resource to the recipient; and
- means for transmitting, from the client wireless device, a second RACH message to the recipient on a second time domain resource after the first time domain in response to receiving the discovery message from the recipient, the second time domain resource being defined by a mapping from the first time domain resource.

28. A non-transitory computer-readable medium storing computer code executable by a processor for wireless communications, comprising code to:
- receive a discovery message from a recipient;
- transmit, from a wireless device, a random access channel (RACH) preamble on a first time domain resource to the recipient; and
- transmit, from the wireless device, a second RACH message to the recipient on a second time domain resource after the first time domain resource in response to receiving the discovery message from the recipient, the second time domain resource being defined by a mapping from the first time domain resource.

* * * * *